United States Patent [19]

Ingram

[11] Patent Number: 5,074,438

[45] Date of Patent: Dec. 24, 1991

[54] FULL SERVICE CAR WASH FRAGRANCE DISPENSING MACHINE

[75] Inventor: James L. Ingram, Pine Bluff, Ark.

[73] Assignee: Fragra*Matics Mfg Co. Inc., Pine Bluff, Ark.

[21] Appl. No.: 514,682

[22] Filed: Apr. 24, 1990

[51] Int. Cl.⁵ .............................................. B67D 5/60
[52] U.S. Cl. ................................. 222/132; 222/144.5; 222/630; 239/526
[58] Field of Search ...................... 222/132, 136, 144.5, 222/608, 630, 637, 639, 642, 649; 239/307, 350, 416.1, 526; 261/18.1, 78.2

[56] References Cited

U.S. PATENT DOCUMENTS

| | | | |
|---|---|---|---|
| 2,746,641 | 5/1956 | King | 222/132 |
| 2,910,248 | 10/1959 | Kueter et al. | 261/18.1 |
| 3,144,967 | 8/1964 | McClain | 222/144.5 |
| 3,825,154 | 7/1974 | Jaeger | 222/136 |
| 3,880,330 | 4/1975 | Leas et al. | 222/136 |
| 3,891,149 | 6/1975 | Rendemonti | 239/526 |
| 4,005,825 | 2/1977 | Schowiak | 239/526 |
| 4,433,796 | 2/1984 | Brooks, Jr. | 222/608 |
| 4,527,713 | 7/1985 | Ingram | 222/136 |
| 4,968,166 | 11/1990 | Ingram | 401/1 |

Primary Examiner—Kevin P. Shaver
Assistant Examiner—Shari Wunsch
Attorney, Agent, or Firm—Stephen D. Carver

[57] ABSTRACT

A fragrance dispensing machine for full service car wash installations administers a carefully controlled amount of fragrance concentrate to precisely scent customer vehicles. The machine is preferably mounted upon a wall adjacent the car wash lane for convenient access vehicles being washed. An associated hand-operated applicator gun interconnected with the machine administers a uniform dose of fragrance concentrate during each application, which is outputted as a fine mist. The machine cabinet provides storage space for bottles of fragrance concentrate. An external source of air pressure is applied to the cabinet for generating the mist. An elongated conduit interconnects the applicator gun and the machine and separate conductive tubes within the gun conduit individually transmit air and fragrance concentrates to an atomizer manifold disposed within the applicator gun. Mixing of air and fragrance concentrate is performed within the atomizer through vacuum venturi suction. High pressure air driven through the atomizer and the gun barrel sucks fragrance concentrate out of an adjacent fragrance manifold passageway. Fragrance misting is performed in the applicator gun to minimize fragrance contamination. Operation is monitored and controlled by the machine circuit remotely disposed within the cabinet.

4 Claims, 4 Drawing Sheets

FULL SERVICE CAR WASH FRAGRANCE DISPENSING MACHINE

BACKGROUND OF THE INVENTION

The present invention relates generally to fragrance machines for car wash installations. More particularly, the present invention comprises a fragrance dispensing machine ideally adapted for full service car wash installations.

In the prior art, a variety of fragrance machine are known in the car wash industry. Many systems include pneumatic applicators which force a mixture of air and fragrance through an elongated tube. The output from an applicator gun usually comprises a mist which can be applied by the applicator within the various portions of the car such as underside of seats or the like. In my U.S. Pat. No. 4,527,713, issued July 9, 1985, I provided a coin-operated fragrance dispenser ideally adapted for self service, coin operated car washes. The system enabled the consumer to dispense a fragrance into his vehicle to deodorize the vehicle and to provide a fresh, attractive-smelling interior. Primarily the latter device employed an aesthetically attractive display in which unique colorized solutions disposed within translucent plastic cylinders provided a visual attraction for potential customers.

In "full service" car wash operations, it is typical to provide fragrance injection as an "accessory" to the basic washing services ordered by a customer. Sometimes the fragrance application service is sold in a "package deal," and scents are applied to the vehicle interior as the car moves through the line. Individual self-pumping pump spray bottles containing desired scents are often used to apply fragrances in conventional full service car washes. However, full service car washes often employ a number of relatively poorly skilled and generally less than attentive workers. As a result, the use of spray bottles often results in irregularly applied doses of fragrance. The use of such spray bottles invites irregular scent application, since it is very difficult to provide a consistent amount of fragrance. When too little fragrance is injected, the customer may become dissatisfied. When too much fragrance is injected, drying may be incomplete. As mentioned in my patent entitled Carpet Cleaning Machine with Foaming Control Block with Heater and Brush, U.S. Pat. No. 4,968,166, issued Nov. 6, 1990, the accumulation of excess liquid and improper drying of the upholstery of the vehicle being cleaned can result in mildew and even corrosion. Thus when too much fragrance is dispensed, the overdose can resultant in a damp-smelling interior. It is extremely desirable to provide a uniform dose of fragrance so that the proper amount of fragrance concentrate is dispensed.

Another problem with prior art applicators is that dyes are usually used in the fragrance concentrate so that personnel can discern which fragrance is to be dispensed. Conventional spray bottles are manually filled from larger bottles and the color of the product warns the applicator of the particular scent. Typically, however, this means that the colored dye is also injected in the customer's vehicle. An overdose of dyed product may discolor certain vehicle interiors. Also, the mixture may include a soap carrier which may stain the car or vehicle being sprayed. Thus it is desirable to avoid the use of colored dyes, and to provide the operator with a machine-selected fragrance which functions independently of dye color. Although not part of the present invention, it is thought desirable to provide a customer display column simulating fragrances in the customer waiting area of the car wash. Such display units may be ideally constructed in accordance with the teachings of my prior U.S. Pat. No. 4,527,713.

Hence it is desirable in the full service car wash industry to provide a machine which utilizes non-colored fragrance concentrates and which uniformly applies them in strictly controlled doses. Such a machine must be capable of reliable use by relatively unskilled personnel, and must be able to function properly in high volume locations within a hostile environment.

SUMMARY OF THE INVENTION

The present invention comprises a fragrance dispensing machine for use at full service car washes. The machine administers a carefully controlled amount of fragrance concentrate to reliably treat vehicles being processed through a full service car wash.

The machine is mounted either upon a convenient wheeled carriage, or it may be secured to a wall adjacent the car wash lane for convenient access to vehicles. An associated hand-operated applicator gun interconnected with the machine administers a uniform dose of fragrance concentrate which is outputted as a fine mist. The machine comprises a rigid, box-like stainless steel cabinet for housing its components. The convenient cabinet door may be opened for service of interior components. Storage space for bottles of fragrance concentrate is provided on top of the cabinet. An external source of air pressure is applied to the cabinet for generating the mist.

An elongated conduit interconnects the applicator gun and the machine, and separate conductive tubes within the gun conduit individually transmit air and fragrance concentrates to an atomizer manifold within the applicator gun. Mixing of air and fragrance concentrate is performed within the atomizer through vacuum venturi suction. High pressure air driven through the atomizer and the gun barrel in effects sucks fragrance concentrate out of an adjacent fragrance manifold passageway. Fragrance misting is performed in the applicator gun to minimize fragrance contamination. However, operation is monitored and controlled by the machine circuit remotely disposed within the cabinet.

The circuit comprises an isolation transformer which supplies 24 volt A.C. A relay controls associated air solenoids for activating the high pressure air line and individual suction paths from the fragrance reservoirs to the applicator gun. An internal programmable timer limits the vend to a preferred three and a half second applicating duration. A three position switch selects which of the preferably three fragrance valves are operated.

Thus a fundamental object of the present invention is to provide a fragrance dispenser for full service car washes.

A related object is to provide a full service car wash fragrance dispenser of the character described adapted to be conveniently disposed in the full service car wash production line for convenient use by attendants.

Another object of the present invention is to provide a fragrance dispenser for full service car washes which can easily and conveniently be switched between multiple fragrances.

A similar object is to provide a full service car wash fragrance dispenser which, when switched between desired fragrances, minimizes the intermingling of dispensed fragrance with portions of fragrance previously dispensed.

Another fundamental object of the present invention is to precisely meter and control the amount of fragrance dispensed.

A still further object of the present invention is to provide an automated fragrance dispensing system for full service car washes which completely obviates the need for conventional spray bottle fragrance applicating.

A related object is to provide a system of the character described for full service car wash fragrance dispensing which consistently delivers a uniform amount of fragrance so that quality control is rigorously maintained.

A similar object of the present invention is to provide a full service car wash fragrance dispensing machine of the character described which repeatedly dispenses a uniform dose of fragrance concentrate.

Another basic object is to provide a machine for dispensing fragrances which can be used with a minimum of training by a relatively unskilled workers.

Another object of the present invention is to provide a system for dispensing fragrances which will not stain or discolor the interior furnishing of an automobile or vehicle.

A related object is to provide a fragrance dispensing machine of the character described which can be moved around easily upon a wheeled cart, or which can be conveniently mounted to a stanchion, wall, or the like.

Another object is to provide a full service fragrance dispensing machine which provides uniform fragrance solution ejection to prevent waste, maintain quality control, and prevent unnecessary dampness in customer vehicles.

Another related object is to provide a full service fragrance dispensing machine of the character described which utilizes a minimum of liquid fragrance concentrate to prevent dampness.

A similar object is to reduce molding which might otherwise occur in most vehicles.

Another object of this invention is to minimize overheating in the injection relay coils in atomization systems.

Another fundamental object is to increase the atomization in a concentrated fragrance dispenser for full service operation.

Another object is to provide a reliable atomization system which dispenses uniform doses of fragrances in a fine mist form.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
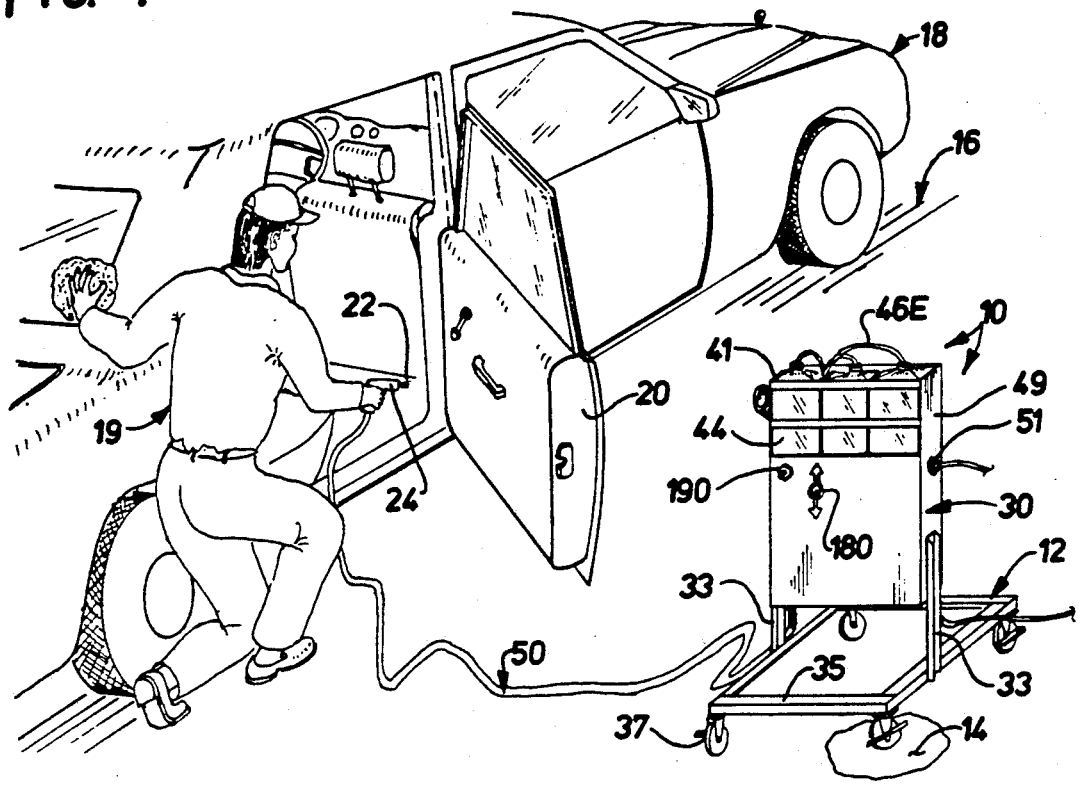
FIG. 1 is a fragmentary, pictorial view illustrating my Full Service Car Wash Fragrance Dispensing Machine in operation within a typical full service car wash.

With initial reference directed to FIG. 1 of the drawings, a full service fragrance dispensing machine constructed in accordance with the teachings of my invention has been generally designated by reference numeral 10. The fragrance dispensing machine 10 may comprise a convenient wheeled carriage 12 facilitating easy maneuvering of the machine 10 about the concrete surface 14. The carriage is optional, and it is preferred to securely mount machine 10 adjacent the automated car wash lane 16 for convenient access to a vehicle 18 being washed. In operation, a worker 19 may open the vehicle door 20 and inject a fine mist 22 of fragrance with the hand-held applicator gun 24. As discussed hereinafter, machine 10 controls applicator gun 24 such that a uniform dose of fragrance concentrate will be applied during each "vend."

With concurrent reference now directed to FIGS. 1-4, my fragrance dispensing machine 10 comprises a rigid, generally cubical and box-like stainless steel cabinet 30 which may be secured to either the supportive carriage 12, or an adjacent wall of the car wash bay. When carriage 12 is employed, the cabinet 30 will be firmly coupled about the carriage center between upwardly projecting, rigid stanchions 33 emanating from opposite sides of carriage base 35. A plurality of standard caster wheels 37 are secured to the carriage base 35. The cabinet 30 receives and stores a number of fragrance bottles 44, 45 and 46, which are preferably disposed within the open top of cabinet 41. The bottles are retained between upper cabinet rails 48 and the uppermost portions of cabinet sides 49.

Figure 3:
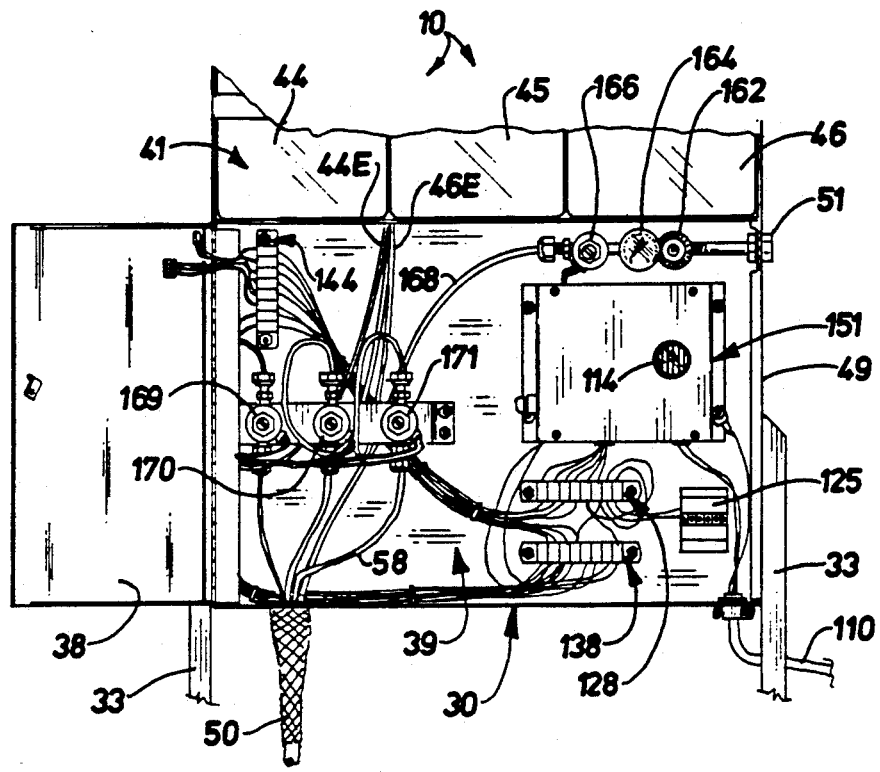
FIG. 3 is an enlarged, fragmentary, interior elevational view thereof.

A conventional lock 36 mounted in cabinet door 38 is accessible via front door surface 38A to permit door 38 to be opened as viewed in FIG. 3, exposing the interior 39 of the cabinet. The cabinet interior 39 houses various components and circuitry illustrated primarily in FIGS. 3 and 4. The machine control circuit, which has been generally designated by the reference numeral 40 (FIG. 5), will be discussed hereinafter.

Figure 6:
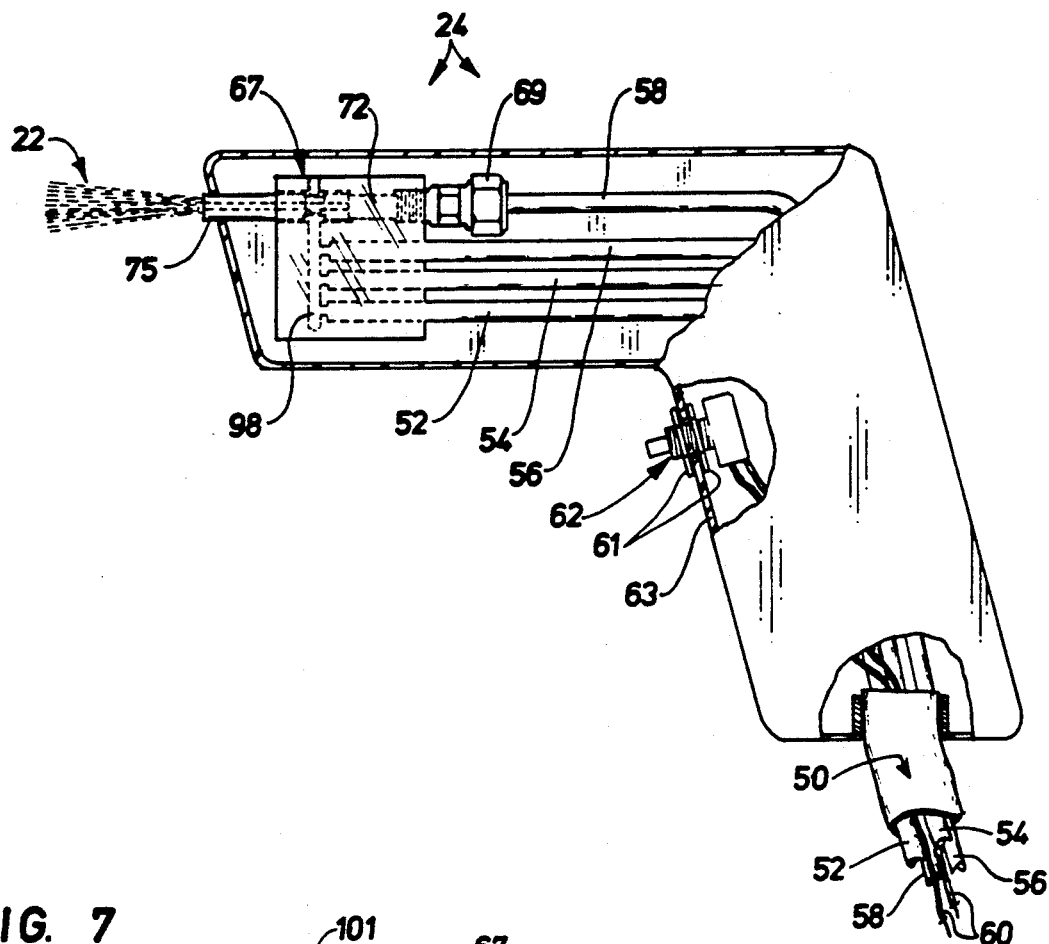
FIG. 6 is an enlarged, fragmentary elevational view of the preferred applicator gun, with portions thereof broken away or shown in section for clarity.

As will later be explained, the gun responds to an externally supplied source of air pressure to generate and output mist 22. Preferably high pressure air is connected to the cabinet-mounted pneumatic fitting 51. The applicator gun 24 is interconnected with cabinet 30 by an elongated conduit 50. With reference now to FIG. 6, conduit 50 comprises a plurality of individual fluid-conductive tubes for transmitting air and fragrance concentrate to gun 24. Tubes 52, 54, and 56 transmit fragrance concentrate interiorly of the gun and hose 58 transmits high pressure air. Additionally, electrical conductors 60 are routed through conduit 50.

They are interconnected with the push button trigger switch 62 for gun-starting a vend. Switch 62 is mounted to the plastic wall 63 of the gun 24 and is secured by a pair of conventional nuts 61.

Figure 7:
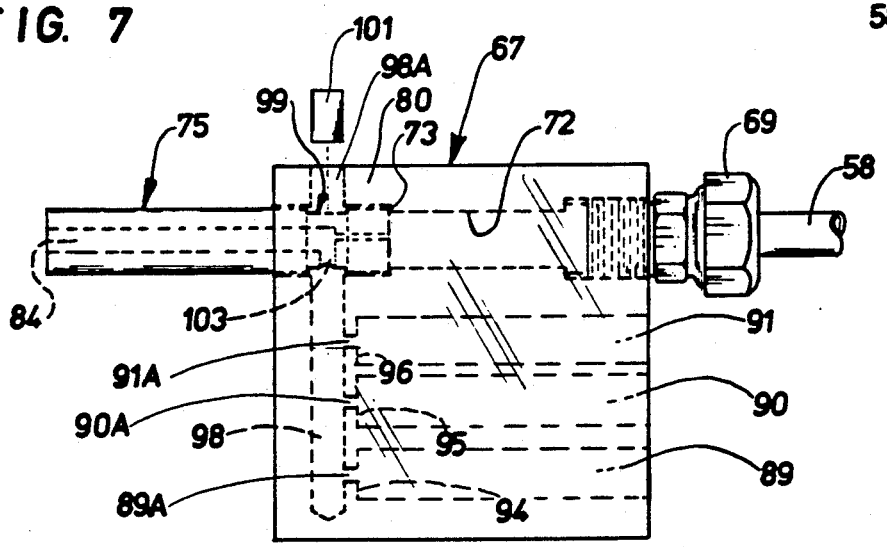
FIG. 7 is an enlarged elevational view of the preferred atomizer manifold.

As best viewed in FIGS. 6 and 7, high pressure air arriving from line 58 is coupled to a generally rectangular, interiorly disposed atomizer manifold 67 via a conventional threaded fitting 69. Fitting 69 is threadably received within an elongated tubular passageway 72 defined within the upper portion of the body 80 of the atomizer manifold 67. This primary manifold passageway 72 includes an internal shoulder 73 (FIG. 7) which abuts the end of an elongated, tubular dispensing barrel 75. As viewed in FIG. 6, an aerated mist of fragrance 22 is dispensed from the end of barrel 75. Barrel 75 includes an interior passageway 84 in fluid flow communication with the primary manifold passageway 72 through which fragrance is ultimately ejected.

With reference directed to FIG. 7, the fragrance concentrate tubes 52, 54, and 56 enter the gun, respectively terminating within passageways 89, 90 and 91 within the atomizer manifold 67. Passageways 89, 90 and 91 each comprise reduced-diameter portions 89A, 90A, and 91A respectively separated by boundary shoulders 94, 95, and 96. The reduced-diameter portions 89A, 90A, and 91A of the fragrance passageways each communicate with a common, generally perpendicularly-oriented fragrance connecting passageway 98 which is in fluid flow communication with primary high pressure air passageway 72. When the fragrance tubes 52, 54, and 56 are inserted into passageways 89-91, they will be prevented from entering passageway 98 by the shoulders 94-96.

Figure 8:
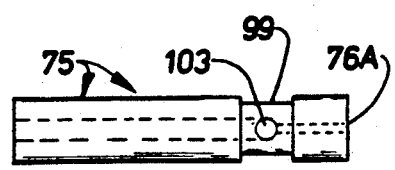
FIG. 8 is an bottom plan view of the spray barrel.

With additional reference directed to FIG. 8, barrel 75 comprises a reduced diameter intermediate neck portion 99 in which a venturi orifice 103 is defined. When assembled, barrel end 76A firmly abuts internal manifold passageway shoulder 73 to position neck portion 99 (and thus orifice 103) in alignment within passageway 98. A plug 101 is then inserted into the top 98A of passageway 98 (FIG. 7) to lock the barrel 75 in place.

In operation, high pressure air enters chamber 72 at approximately 30–40 PSI. Air flows out of passageway 84 of barrel 75, creating suction in venturi orifice 103 intercommunicating with passageway 98. As will be explained hereinafter, only one of the fragrance tubes interconnected with the fragrance passageways 89-91 will be active at this time, depending upon which fragrance was selected by the operator. Suction transmitted to passageway 98 will draw the selected fragrance into passageway 98, and into and out of barrel 75 via a venturi effect. The flow will be through venturi orifice 103 into barrel passageway 84.

Figure 2:
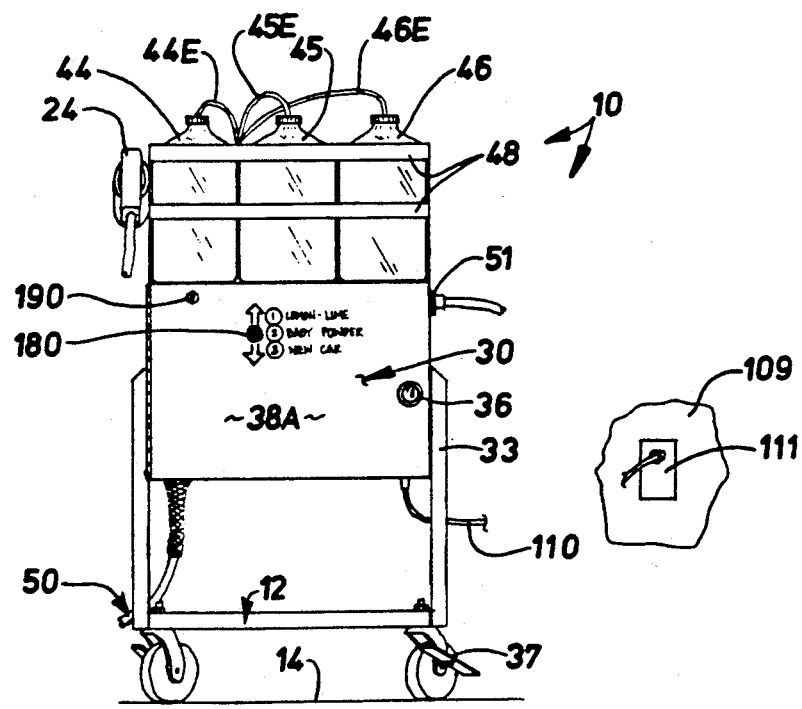
FIG. 2 is an enlarged, front elevational view of the machine.
Figure 4:
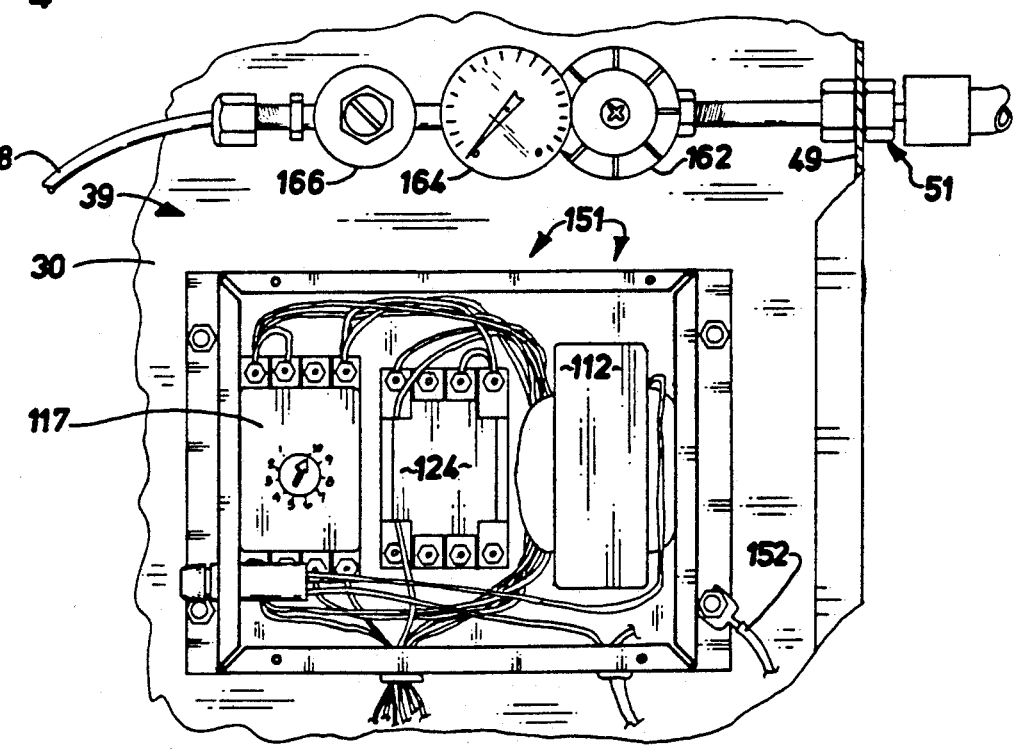
FIG. 4 is an enlarged, fragmentary view of the timer relay and solenoid control housing and circuitry.
Figure 5:
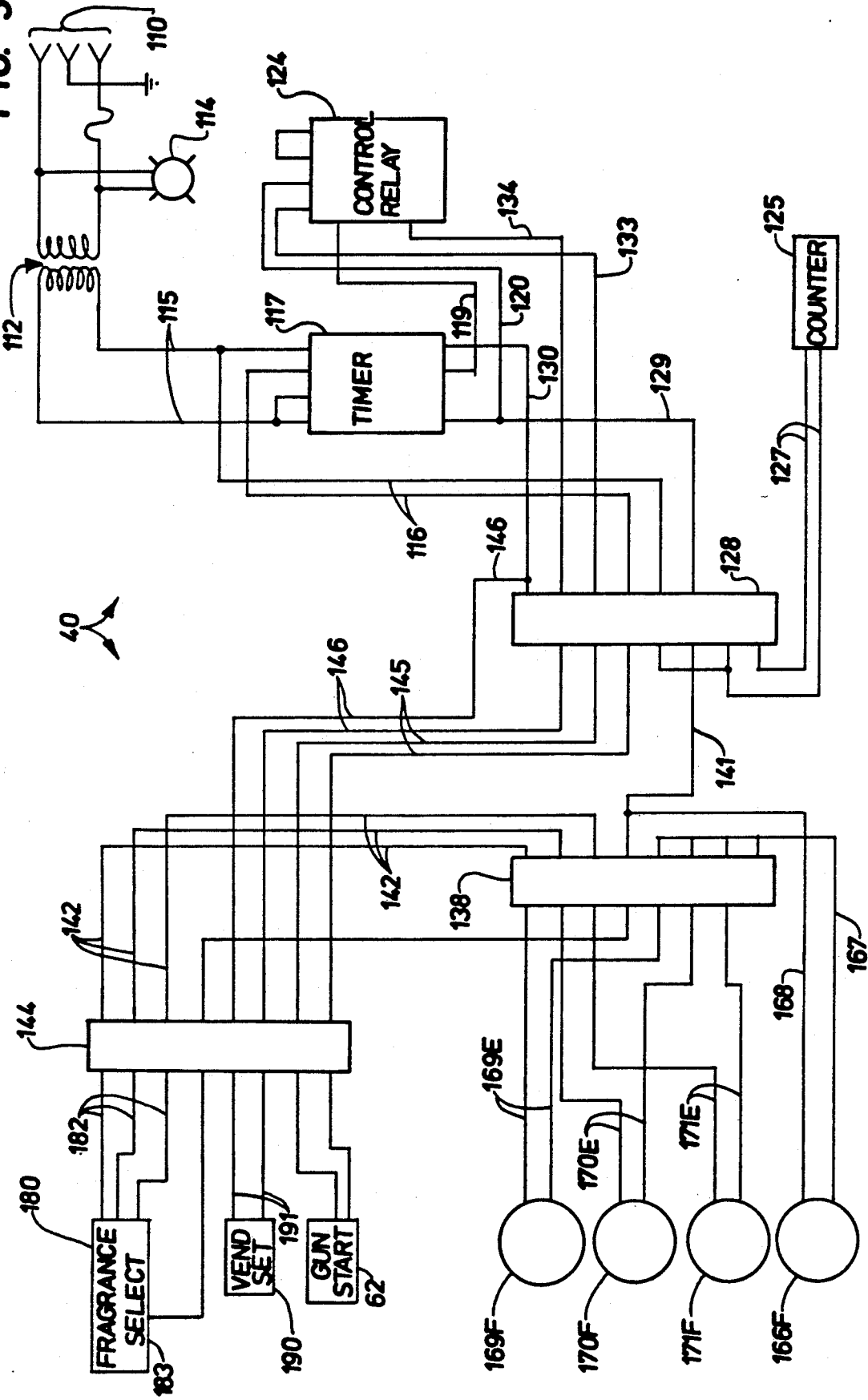
FIG. 5 is an electrical wiring diagram illustrating preferred component connections.

With reference now to FIG. 3-5, the machine is powered by conventional 120 volt A.C. supplied via line 110 coupled to A.C. outlet 111 in wall 109 (FIG. 2). Nominally 24 volt A.C. power is supplied to circuit 40 by the isolation transformer 112, energization of which is monitored by pilot light 114. Power appearing across lines 115 is applied directly to an internal timer 117, and to bus 128 via lines 116. Timer 117 outputs on lines 119 and 120 to a circuit control relay 124. The timer is also interconnected with bus 128 via lines 129 and 130. Relay 124 outputs to bus 128 via lines 133 and 134. Bus 128 is interconnected with bus 138 via a line 141. Lines 142 connect bus 138 with bus 144. Bus 128 is also connected with bus 144 via a plurality of lines 145 and 146. Bus 144 interconnects the control switches for the apparatus with circuit 40, and bus 138 controls the fluid control solenoids to be described later. A counter 125 is interconnected with bus 128 via lines 127.

As best viewed in FIG. 4, it is preferred that the timer 117, relay 124, and power transformer 112 be housed within an isolating compartment 151. Compartment 151 is carefully grounded with line 152 and isolates the relatively high incoming line voltage. All voltage outputted from compartment 151 is 24 volt A.C. Pilot light 114 disposed within the cabinet 151 is visible merely by opening the main cabinet door 38, and indicates that A.C. power is properly applied.

As best viewed in FIGS. 3 and 4, external air is admitted into the apparatus through an high pressure fitting 51. Air is transmitted through a conventional pressure select valve 162, and a pressure gauge 164 to a primary air solenoid valve 166. Air is transmitted through line 168 which is in fluid flow communication with line 58 within the gun.

It will be noted that the field 166F (FIG. 5) of primary solenoid valve 166 is interconnected with bus 138 via lines 167 and 168. Each fragrance control solenoid 169, 170 and 171 (FIG. 3) have their fields 169F, 170F, and 171F respectively interconnected with bus 138 by lines 169E, 170E, and 171E respectively, as indicated in FIG. 5. Depending upon the fragrance selected, one of the fragrance control solenoids 169-171 will be activated. When this occurs, fragrance concentrate will be drawn by suction from the fragrance concentrate container 44, 45, or 46 disposed at the top of the cabinet through one of the selected lines 44E, 45E, or 46E (FIGS. 2, 3). These fragrance lines lead through the tops in the container bottles to the fragrance control solenoids. Thus a suction path will ultimately be created between the fragrance containers and the atomizer manifold 67 (FIG. 7) discussed earlier. Suction applied to passageway 98 in the manifold 67 because of venturi suction can activate only one fragrance line, depending upon which solenoid 169, 170, or 171 is active at the time.

The three-position, fragrance-select switch 180 (FIG. 5) is interconnected with bus 144 via lines 182 and 183. The switch 180 selects which of the three fragrance valve fields 169F-171F is to be electrically activated. Switch 180 is mechanically mounted upon the cabinet door 38 for easy access (FIGS. 1, 2). It is preferred that selected fragrances are plainly labeled on the cover. Thus by way of example, this three position switch 180 can be disposed in either the "lemon-lime," "baby powder," or "new car" position. Instructions transmitted primarily on lines 142 will activate the selected fragrance relay field to thus activate the appropriate fluid control solenoid 169, 170, or 171.

In order to cause a vend, the vend set button 190 must first be activated. Button 190 communicates via lines 191 to bus 144. Lines 145, 146 intercommunicate vend set button 190 to relay 124 via bus 128 to allow a vend. Vend set button 190 is also located for easy access on the front panel of the cabinet as seen in FIGS. 1 and 2. When vend set button 190 is activated, relay 124 energizes the circuit by closing its associated contacts, and by transmitting power to the timer circuit and through lines 133 and 134.

Subsequently, lines 145 can be activated by pistol switch 62 to complete the circuit to timer 117, causing it to initiate and time a subsequent vend. Timer 117 is user-programmable, and ideally it should be "on" for three and a half seconds after activation. When timer 117 is activated, it will energize bus 128 via line 129, and bus 138 via line 141. At this time, the 24-volt air solenoid valve 166 will be activated, and high pressure air will be transmitted into the apparatus as previously described. Concurrently with energization of line 141, one of the fluid solenoids 169-171 will be activated, depending upon the setting of switch 180.

Thus when a vend is to occur, fragrance select switch 180 is first deployed to select the desired fragrance. Then button 190 is pushed to activate relay 124. The applicator may take his time and when he is ready, he need merely hit pistol grip switch 62 to apply spray. Spray will last for three and a half seconds or as established by timer 117, and it is important to note that a minimum of spray residue from a prior vend will be dispensed in the instant vend.

In particular, it will be noted that each of the fragrance lines 52, 54, and 56 running through the gun will have a small amount of residue from the most recent vend. However, through the vacuum venturi effect formed within the atomizer manifold 67 as previously described only one of the lines 52, 54, or 56 can respond to suction supplied by the manifold passageway 89A, 90A and 91A. In other words, since only one of the fragrance control relays will be open at one time, only one scent will be pulled into the manifold passageway 98. This scent will be sucked into the gun barrel 75 through venturi suction in venturi hole 103.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A multiple fragrance dispensing machine for full service car washes, said dispensing machine comprising:
   rigid enclosure means adapted to be disposed adjacent a car wash lane for housing components of said machine;
   circuit means disposed within said enclosure means for controlling said machine;
   container means for storing a plurality of fragrance concentrates to be dispensed;
   applicator gun means for precisely dispensing a mist of fragrance of a desired scent, said gun means comprising a housing adapted to be grasped by a user, a trigger switch secured to said housing for activating said circuit means, and an internal atomizer manifold comprising:
      a high pressure air passageway adapted to be interconnected with a source of high pressure air via an air line extending from said enclosure means to said gun means;
      a dispensing barrel for outputting mist;
      a venturi defined between said high pressure air passageway and said dispensing barrel;
      a plurality of separate fragrance passageways adapted to be individually connected in fluid flow communication with said plurality of fragrance concentrates via a plurality of fluid conductive tubes extending from said enclosure means to said gun means;
      a common fragrance connecting passageway interconnected with each of said separate fragrance passageways; and,
      whereby suction from said venturi draws fragrance from said connecting passageway for subsequent discharge through said barrel; and,
   said circuit means comprising solenoid means for individually activating said air line and one of said fluid conductive tubes so that said gun outputs mist of a single scent.

2. The fragrance dispensing machine as defined in claim 1 wherein said discharge barrel comprises an elongated, generally tubular internal passageway and a reduced diameter neck portion containing a suction orifice forming said venturi and aligned in fluid flow communication with said common fragrance passageway, so that high pressure air rushing interiorly therethrough applies vacuum suction to said common passageway to withdraw fragrance therefrom.

3. A multiple fragrance dispensing machine for full service car washes, said dispensing machine comprising:
   wheeled carriage means adapted to be disposed upon a supporting surface for moving said machine to a desired work location;
   circuit means disposed within said carriage means for controlling said machine;
   container means for storing a plurality of fragrance concentrates to be dispensed;
   applicator gun means for precisely dispensing a mist of fragrance of a desired scent, said gun means comprising a housing adapted to be grasped by a user, a trigger switch secured to said housing for activating said circuit means, and an internal atomizer manifold comprising:
      a high pressure air passageway adapted to be interconnected with a source of high pressure air via an air line extending from said carriage means to said gun means;
      a dispensing barrel for outputting mist;
      a venturi defined between said high pressure air passageway and said dispensing barrel;
      a plurality of separate fragrance passageways adapted to be individually connected in fluid flow communication with said plurality of fragrance concentrates via a plurality of fluid conductive tubes extending from said carriage means to said gun means;
      a common fragrance connecting passageway interconnected with each of said separate fragrance passageways; and,
      whereby suction from said venturi draws fragrance from said connecting passageway for subsequent discharge through said barrel; and,
   said circuit means comprising solenoid means for individually activating said air line and one of said fluid conductive tubes so that said gun outputs mist of a single scent.

4. The fragrance dispensing machine as defined in claim 3 wherein said discharge barrel comprises an elongated, generally tubular internal passageway and a reduced diameter neck portion containing a suction orifice forming said venturi and aligned in fluid flow communication with said common fragrance passageway, so that high pressure air rushing interiorly therethrough applies vacuum suction to said common passageway to withdraw fragrance therefrom.

* * * * *